(12) United States Patent
Darg (10) Patent No.: US 11,010,773 B2
(45) Date of Patent: May 18, 2021

(54) OBTAINING STATISTICAL INFORMATION FOR NETWORK-ACCESSIBLE DATA STORES WHILE PRESERVING USER ANONYMITY

(71) Applicant: THE JOHNS HOPKINS UNIVERSITY, Baltimore, MD (US)

(72) Inventor: Daniel W. Darg, Arlington, VA (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 170 days.

(21) Appl. No.: 16/075,472

(22) PCT Filed: Feb. 3, 2017

(86) PCT No.: PCT/US2017/016445
§ 371 (c)(1),
(2) Date: Aug. 3, 2018

(87) PCT Pub. No.: WO2017/136683
PCT Pub. Date: Aug. 10, 2017

(65) Prior Publication Data
US 2019/0066135 A1    Feb. 28, 2019

Related U.S. Application Data

(60) Provisional application No. 62/291,906, filed on Feb. 5, 2016, provisional application No. 62/293,073, filed on Feb. 9, 2016.

(51) Int. Cl.
*G06Q 30/02* (2012.01)
*G06F 11/34* (2006.01)
(Continued)

(52) U.S. Cl.
CPC ..... *G06Q 30/0203* (2013.01); *G06F 11/3438* (2013.01); *G06F 16/00* (2019.01);
(Continued)

(58) Field of Classification Search
None
See application file for complete search history.

(56) References Cited

U.S. PATENT DOCUMENTS 7,523,191 B1 *   4/2009   Thomas ............. G06F 11/3438
                                                            709/202
2004/0230989 A1  11/2004  Macey et al.
(Continued)

FOREIGN PATENT DOCUMENTS

WO    WO2013-154215 A1    10/2013
WO    WO-2015017380 A1 *  2/2015    ......... G06Q 30/0203
(Continued)

OTHER PUBLICATIONS

López-Fernández, Luis, et al. "Designing and evaluating the usability of an API for real-time multimedia services in the Internet." Multimedia Tools and Applications 76.12 (2017): 14247-14304. (Year: 2017).*

(Continued)

*Primary Examiner* — Matthew S Gart
*Assistant Examiner* — Derick J Holzmacher
(74) *Attorney, Agent, or Firm* — MH2 Technology Law Group LLP (57) ABSTRACT

The present invention generally relates to techniques for obtaining value latent in elementary pieces of data that are (i) human-related, and (ii) transferable on a network to be amplified and commoditized by enabling multiple similar such elementary pieces of data to be combined into value-added statistical products, generating revenue through the selling of access to the statistical products, and then distributing the revenue in measure to holders of dividend-yielding shares of the statistical products. The technique employs (Continued)

measures for statistical-disclosure control so that individuals associated with the elementary pieces of data remain anonymous.

21 Claims, 8 Drawing Sheets

(51) Int. Cl.
*G06F 16/00* (2019.01)
*G06F 16/951* (2019.01)
*H04L 29/06* (2006.01)

(52) U.S. Cl.
CPC ....... *G06F 16/951* (2019.01); *G06Q 30/0201* (2013.01); *G06Q 30/0236* (2013.01); *H04L 63/0421* (2013.01)

(56) References Cited

U.S. PATENT DOCUMENTS

| | | | |
|---|---|---|---|
| 2011/0145570 A1 | 6/2011 | Gressel et al. | |
| 2011/0247028 A1* | 10/2011 | Eyer | H04N 21/433 725/13 |
| 2012/0072261 A1* | 3/2012 | Oberoi | G06Q 30/0203 705/7.32 |
| 2012/0109882 A1* | 5/2012 | Bouse | H04L 67/306 707/607 |
| 2012/0130737 A1* | 5/2012 | Finizio | G06Q 30/02 705/2 |
| 2012/0221502 A1* | 8/2012 | Jerram | G06Q 30/02 706/46 |
| 2012/0244948 A1* | 9/2012 | Dhillon | A63F 13/61 463/42 |
| 2012/0282582 A1 | 11/2012 | Rao | |
| 2013/0339091 A1* | 12/2013 | Humay | G06Q 30/0203 705/7.32 |
| 2014/0087355 A1* | 3/2014 | Henry | G09B 7/00 434/362 |
| 2014/0298260 A1* | 10/2014 | Abowd | G06F 3/04842 715/810 |
| 2014/0337102 A1* | 11/2014 | Skoler | G07F 17/329 705/7.32 |
| 2015/0032509 A1* | 1/2015 | Fuentes | G06Q 30/0203 705/7.32 |
| 2015/0161632 A1* | 6/2015 | Humay | G06Q 30/0203 705/7.32 |
| 2015/0228004 A1* | 8/2015 | Bednarek | G06Q 10/08355 705/26.8 |
| 2016/0140642 A1* | 5/2016 | Jiao | G06Q 40/08 705/2 |
| 2016/0321050 A1* | 11/2016 | Compton | G06Q 30/0214 |
| 2017/0102925 A1* | 4/2017 | Ali | G06F 8/30 |
| 2017/0359281 A1* | 12/2017 | Yip | H04L 51/046 |

FOREIGN PATENT DOCUMENTS

| | | | | |
|---|---|---|---|---|
| WO | WO-2015147656 A2 * | 10/2015 | | G06F 8/30 |
| WO | WO-2015147656 A3 * | 1/2017 | | G06F 8/36 |

OTHER PUBLICATIONS

Zhao, Zhao, S. Ali Etemad, and Ali Arya. "Gamification of exercise and fitness using wearable activity trackers." Proceedings of the 10th international symposium on computer science in sports (ISCSS). Springer, Cham, 2016. (Year: 2016).*

Garcia-Garcia, Jose Maria, et al. "Multimodal affective computing to enhance the user experience of educational software applications." Mobile Information Systems 2018 (2018). (Year: 2018).*

Rosen, Christoffer, and Emad Shihab. "What are mobile developers asking about? a large scale study using stack overflow." Empirical Software Engineering 21.3 (2016): 1192-1223. (Year: 2016).*

PCT International Search Report and Written Opinion dated May 19, 2017 in corresponding International Application.

* cited by examiner

FIG. 1

```
//Questions Collection
...
{
    //Example 'Open-Poll' question answered through the SSP interface
    "questionID":"questionID1",
    "questionCreatorID":"questionCreatorID1",
    "questionLabel":"What is your favorite game on acmegames.com?",
    "inputMode":"open-poll",
    ..., //Other question substructure information
    "responses":{
        //Response Structural Information
        "responseOptions":[
            {
                //1st responseOption to 1st question
                "responseOptionID":"responseID11",
                "responseLabel":"Acme IQ Test",
                "responseType":"boolean",
                ...,
            },
            {
                //2nd responseOption to 1st question
                "responseOptionID":"responseID12",
                ...,
            },
            ...,
            {
                //Nth responseOption to 1st question
                "responseOptionID":"responseID1N",
                "responseLabel":"Other (type name)",
                "responseType":"text",
                ...,
            }
        ],
        //Answers received and associated with responseOptions
        "responseValues":[
            {
                "userID":"userID11",
                "time":"timestamp1",
                "values":{"responseOptionID1":True},
                ... //Other responseValue info (e.g. device used)
            },
            ...,
            {
                "userID":"userID1M",
                "time":"timestamp1M",
                "values":{"responseOptionIDN":"acme car racing!"},
                ...
            }
        ]
    },
},
...
```
⎱ 202

FIG. 2

```
//Questions Collection
...
{
    //Example 'Input-API' question controlled by director of acmegames.com
    "questionID":"questionID2",
    "questionCreatorID":"questionCreatorID2",
    "questionLabel":"What is your highest score on acmegames.com?",
    "inputMode":"input-api",
    ..., //Other question substructure information
    "responses":{
        //Response Structural Information
        "responseOptions":[
            {
                //1st responseOption to 2nd question
                "responseOptionID":"responseID21",
                "responseLabel":"Score",
                "responseType":"numeric",
                ...,
            },
        ],
        //Answers received and associated with responseOptions
        "responseValues":[
            {
                "userID":"userID21",
                "time":"timestamp21",
                "values":{"responseOptionID1":1701},
                ...
            },
            ...,
            {
                "userID":"userID2M",
                "time":"timestamp2M",
                "values":{"responseOptionID1":1705},
                ...
            }
        ]
    },
},
...
```
⎬ 302

1. Service Provider (SP) creates organization account on SSP.
2. Special Service Provider (SSP) provides API-key for that account.
3. SP provides inputs for creation of questions operating in Input-API mode.
4. SSP returns automatically-generated questionIDs and responseIDs for the created questions to SP for SP's future usage of the IAPI.
5. SP submits a download request for the SDK supplied by SSP.
6. SSP returns SDK to SP.
7. SP provides services to user.
8*. User shares data with SP; at some point submits download request for SDK.
9*. SP returns SDK code customized so that data supplied by user triggers IAPI dialog with appropriate choices of questionID, responseID, proposed response value to be imputed and SP-supplied userID for future cross-matching. (8* and 9* can be collapsed into 7.)
10. User triggers IAPI dialog; request is sent to initiate IAPI transaction. Browser/app sessionID also sent.
11. IAPI inputs tested; if approved transactionID is generated; question and response labels for questionID and responseIDs returned; if sessionID is matched with userID then username is returned and confirmation is requested in dialog; else account sign-in/registration dialog is opened;
12. User confirms correct login or logs in (see Fig. 4 left).
13. SSP returns indication for dialog to proceed to data-imputation stage (see Fig. 4 right).
14. User submits response values and corresponding permissions to SSP which records submitted response values in relation to user's userID, user's agreed ownership in revenue generated by questions user contributes to, transactionID, etc.
15*. SP can use IAPI to inquire what response values can be updated for an SP-supplied userID.
16*. SSP returns responseIDs that the SP has permission to update for the SP-supplied userID.
17*. SP updates response values for SP-supplied userID.
18. Investigator provides input decisions for construction of investigation. (see Fig. 5A).
19. SSP combines response values imputed by (or on behalf of) users into statistical product corresponding to requested investigation, computes and returns cost of access to product.
20. Investigator provides currency matching cost.
21. SSP delivers statistical product to investigator.
22. SSP distributes currency received in step 21 to SP and user in measure to agreed ownership.

FIG. 8

OBTAINING STATISTICAL INFORMATION FOR NETWORK-ACCESSIBLE DATA STORES WHILE PRESERVING USER ANONYMITY

CROSS-REFERENCE TO RELATED APPLICATIONS

This application is a national stage conversion under 35 U.S.C. 371 of PCT Application No. PCT/US2017/016445 entitled "OBTAINING STATISTICAL INFORMATION FOR NETWORK-ACCESSIBLE DATA STORES WHILE PRESERVING USER ANONYMITY" filed Feb. 3, 2018, which claims the benefit of, and priority to, U.S. Provisional Patent Application No. 62/291,906 entitled, "OBTAINING STATISTICAL INFORMATION FOR NETWORK-ACCESSIBLE DATA STORES WHILE PRESERVING USER ANONYMITY" filed on Feb. 5, 2016, and U.S. Provisional Patent Application No. 62/293,073 entitled, "OBTAINING STATISTICAL INFORMATION FOR NETWORK-ACCESSIBLE DATA STORES WHILE PRESERVING USER ANONYMITY" filed on Feb. 9, 2016, which are hereby incorporated by reference in their entireties.

FIELD OF THE INVENTION

This invention relates generally to obtaining and providing statistical data regarding network interactions while preserving subject anonymity.

BACKGROUND OF THE INVENTION

Figure 1:
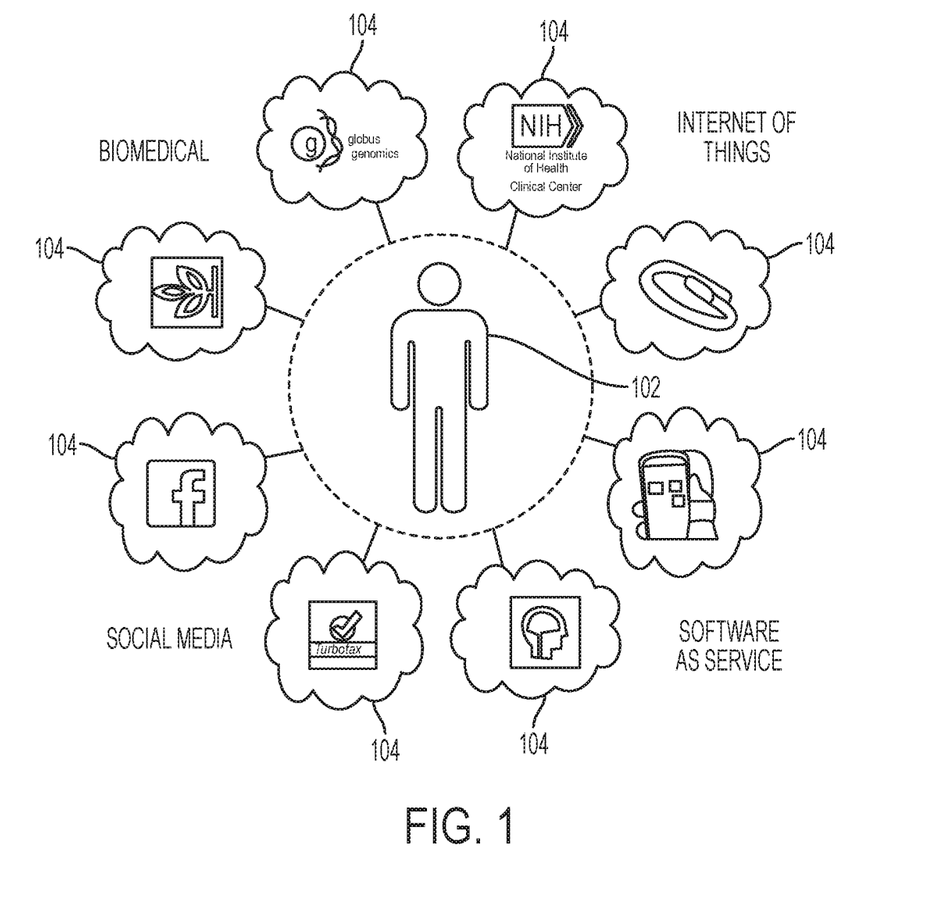
FIG. 1 depicts non-communicating service providers.

Data on the modern individual is stored in many non-communicating devices in "the cloud" as depicted in FIG. 1. Such a store of data typically comes about through the engagement of an individual 102 with one of many kinds of service providers 104 (SP) that record data about the individual on a database that the SP operates. Value associated with such data can be broadly placed into two categories: targeting value and statistical value. Targeting value can manifest when an advertiser is able to direct a message at individuals characterized by data that the advertiser associates with the message. Statistical value can manifest when data is used to provide statistical/correlational insights to, e.g., policy makers. Some embodiments are aimed at unlocking both kinds of value within network-accessible stores of data.

At least two 'Reasons for Exclusivity' (REs) can be identified as to why an SP can associate value with maintaining strict exclusive access to data it collects on such individuals:

RE1. The SP can use such data to generate statistical results that can provide the SP with 'exclusive statistical insights' that, for example, can help the SP to make informed business decisions (potentially conferring a competitive edge to the SP).

RE2. The SP can associate value with its maintaining strict exclusive access to data it collects on such individuals in so far as such practice relates to customer satisfaction. (I.e., If the SP is not perceived as treating the user's data as confidential then users might be less likely to conduct business with the SP.)

Although reasons RE1-2 identify motivation for the SP to not collaborate with other parties using the stored data the SP collects, an overly strict policy on maintaining exclusive use of the data may lead to missed opportunity for both the SP and the individuals associated with elementary pieces of data in a scenario where (i) sharing or collaborating with the data would have resulted in mutually beneficial increases in the value associated with 'statistical insight' (either through the direct benefit of using the collaboratively-improved statistical insights for one's own decision-making needs and/or by the indirect benefit of selling access to same or similar statistical insights to other parties), and where (ii) the principle underlying RE2—maintaining the individual's anonymity—is also respected.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Embodiments of the present technique may provide a service for data collaboration that can benefit one or more participating SPs and individuals associated with the elementary pieces of data used in such statistical collaboration.

The technique describes the structure and operation of a special service provider (SSP) that facilitates mutually beneficial collaboration between SPs, $3^{rd}$ parties willing to provide currency for statistical insights (or the ability to present a person with a targeted message), and individuals from whom elementary pieces of data used to generate statistical results originate, while also providing measures to protect the anonymity of the individuals. The SSP can be embodied in a web application that acts as a repository of same or similar pieces of elementary data. An individual (the 'user') or SP can register an 'individual-user account' or an 'organization account' respectively for usage on the SSP's web application (or simply 'on the SSP' from hereon). In the case of an organization account, one or more individuals representing that organization can be designated as the account's 'director'. The director can be verified by operators of the SSP as officially representing the organization's account and as taking responsibility for transactions made on behalf of the SSP. The SSP can charge for the creation of an organization's account.

The SSP can enable the user/director to create a data structure labeled herein as a 'question' that can be structured as a list consisting of the following substructures: a unique questionID, a question label and one or more data structures labeled herein as a "response option" or simply, "response". A response can be structured as a list consisting of at least the following substructures: a unique responseID, a response 'type' (namely a Boolean, numeric or text type), and a response label. The SSP can enable the user/director to choose the question label (typically an interrogative sentence) and, for any response created, the response type and response label (typically text describing an appropriate response to the interrogative sentence). If a numeric type is selected for a response then the SSP can also enable the user/director to select a corresponding choice of units (e.g., 'kilograms', 'meters') and a range (specified by a 'minimum' and 'maximum' numeric value in the selected units). When a question or response is created, the SSP can automatically supply a unique corresponding questionID or responseID. The SSP can also enable the director to endow the question with further substructure information such as a Boolean indicating whether or not the responses are 'mutually exclusive'. The SSP can also allow the director to endow a response with further substructure information such as a Boolean indicating whether or not the response is 'optional' (i.e., can be selected even if another response has already been selected and the question is designated as having 'mutually exclusive' responses). The SSP can operate a databank that records values that are submitted on behalf of an individual to responses to questions in the SSP. Such a 'response value' is a data structure that is related to a response (and thus is also related to the parent question of the response). The 'response value' can be structured as a list consisting of the following substructures: a 'userID', a 'responseID', and a 'value' that can assume possible values in correspondence with the response 'type' for the response corresponding to the responseID. For example, we can say that a user can submit 'true' to a 'response value' submitted to 'response' with 'response label' attribute 'male' that belongs to 'question' with 'question label' attribute 'Are you male or female?'. The SSP can enable several methods for the submission of 'response values' to such responses where the submitted value is the same data structure as the response's 'type'.

Figure 2:
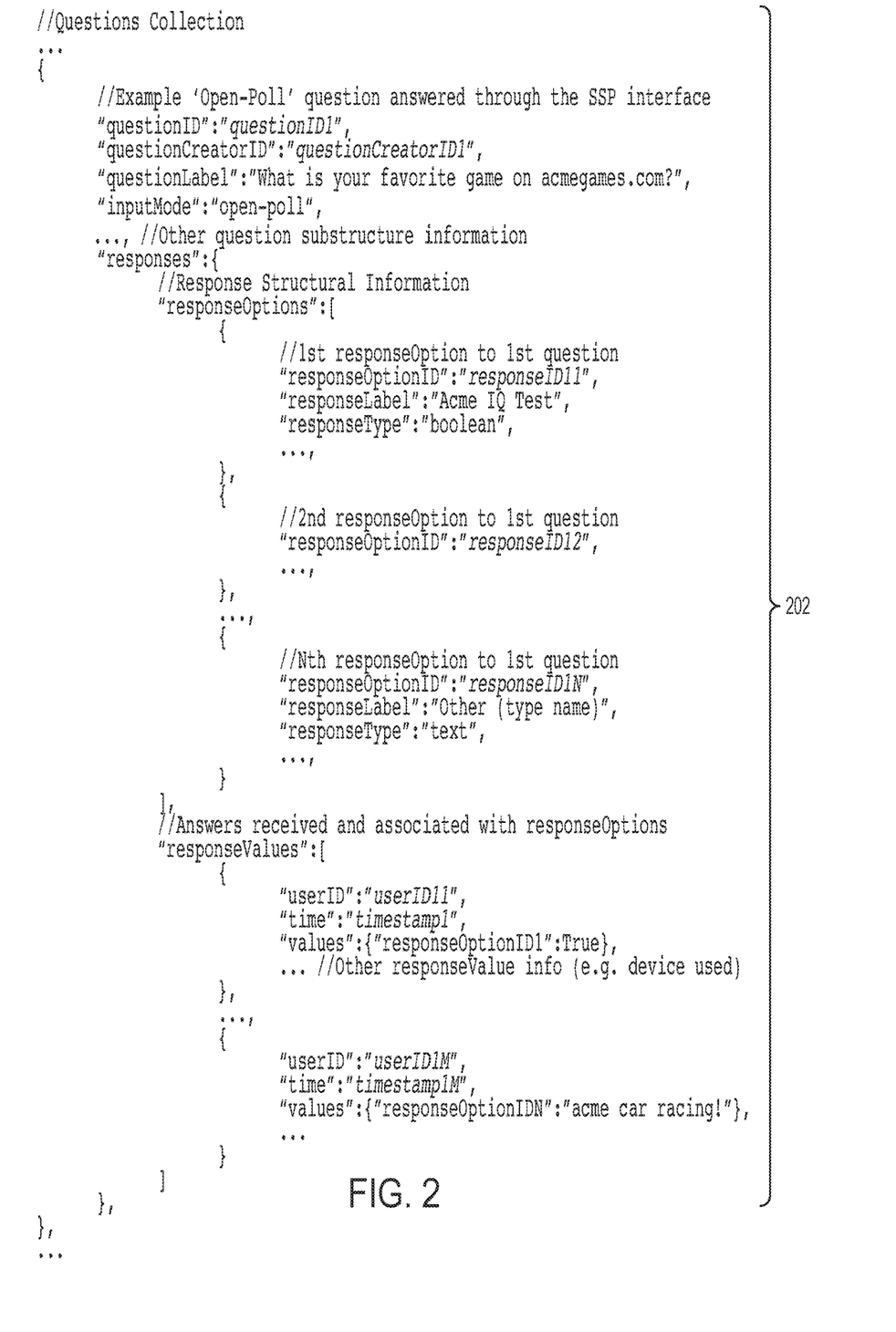
FIGS. 2 and 3 depict example question data structures according to some embodiments.
Figure 3:
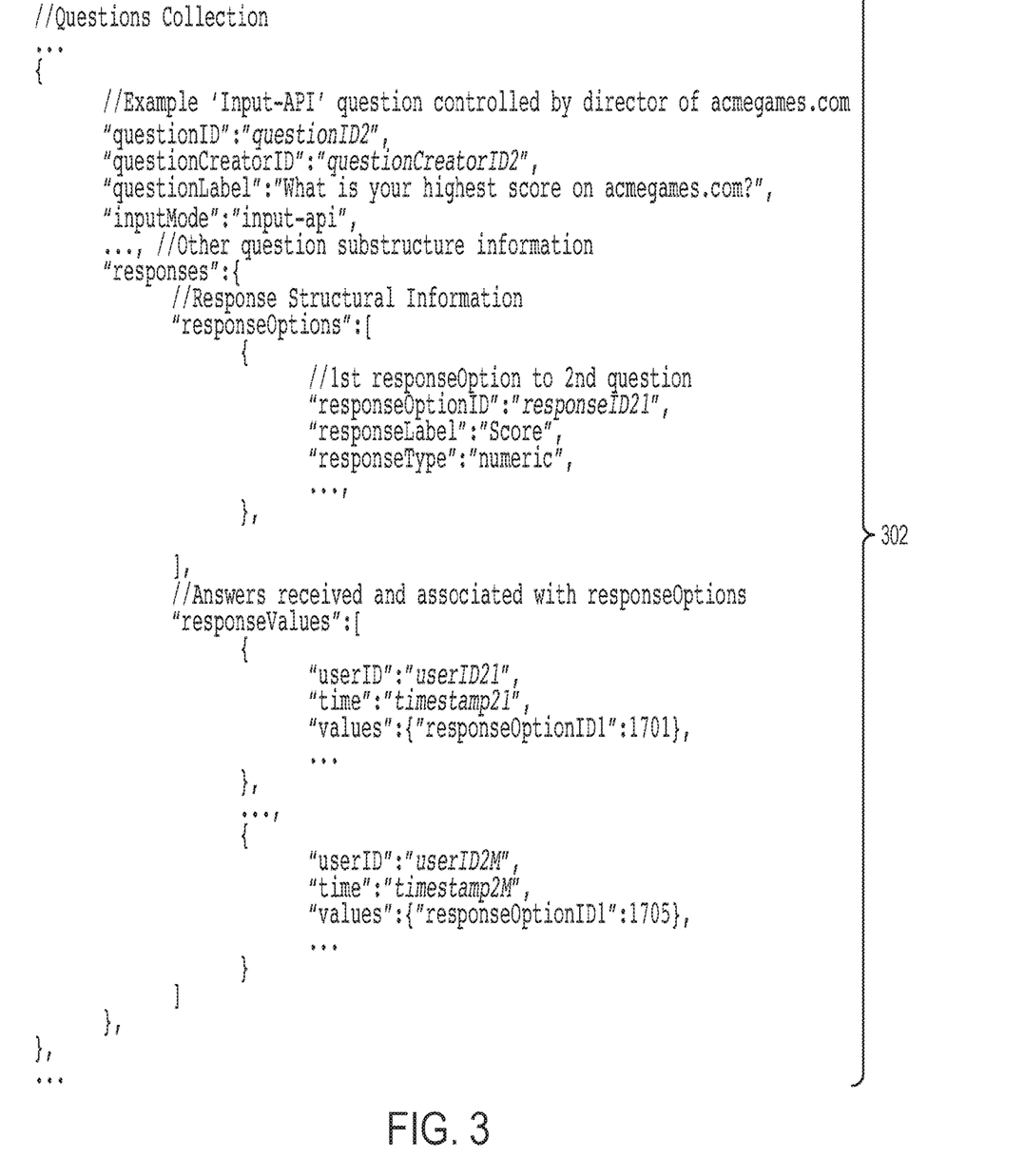

FIGS. 2 and 3 depicts example question data structures 202, 302. The SSP can enable questions to be endowed with substructure information related to usage privileges. In particular, if a user/director creates a question while logged into his account, then that question can be designated as being under the control of that user/director. Control of a question can enable the user/director to determine (at least in part) the ownership of the question (described below). Control of a question can also enable the user/director to determine (at least in part) which other parties will be able to view or otherwise gain access to statistical results generated using response values recorded in relation to such a question. For example, the user/director that controls a question can choose to make the statistical results generated using that question (e.g., the distribution of percentages of response values submitted to responses to that question by some sample of individuals) only viewable by that same user/director (i.e., only viewable if logged-into the account of that user/director). The privileges associated with control can depend on the Input Mode of the question, as now described.

The SSP can enable questions to be endowed with substructure information related to what will be labeled herein as the question's 'Input Mode'. The Input Mode controls how response values are imputed to the SSP in relation to responses for that question. The Input Mode for a question can be one of several types. For example, if the user/director sets the Input Mode of a question to 'Open-Poll' then the SSP can enable statistical results generated by response values submitted to responses to that question to be viewable to anyone on a public interface and the interface can enable anyone to submit response values that will then contribute towards the displayed statistical results. While multiple types of Input Mode are possible, of particular focus to this method is an Input Mode labeled herein as the 'Input-API' mode (described below).

Figure 4:
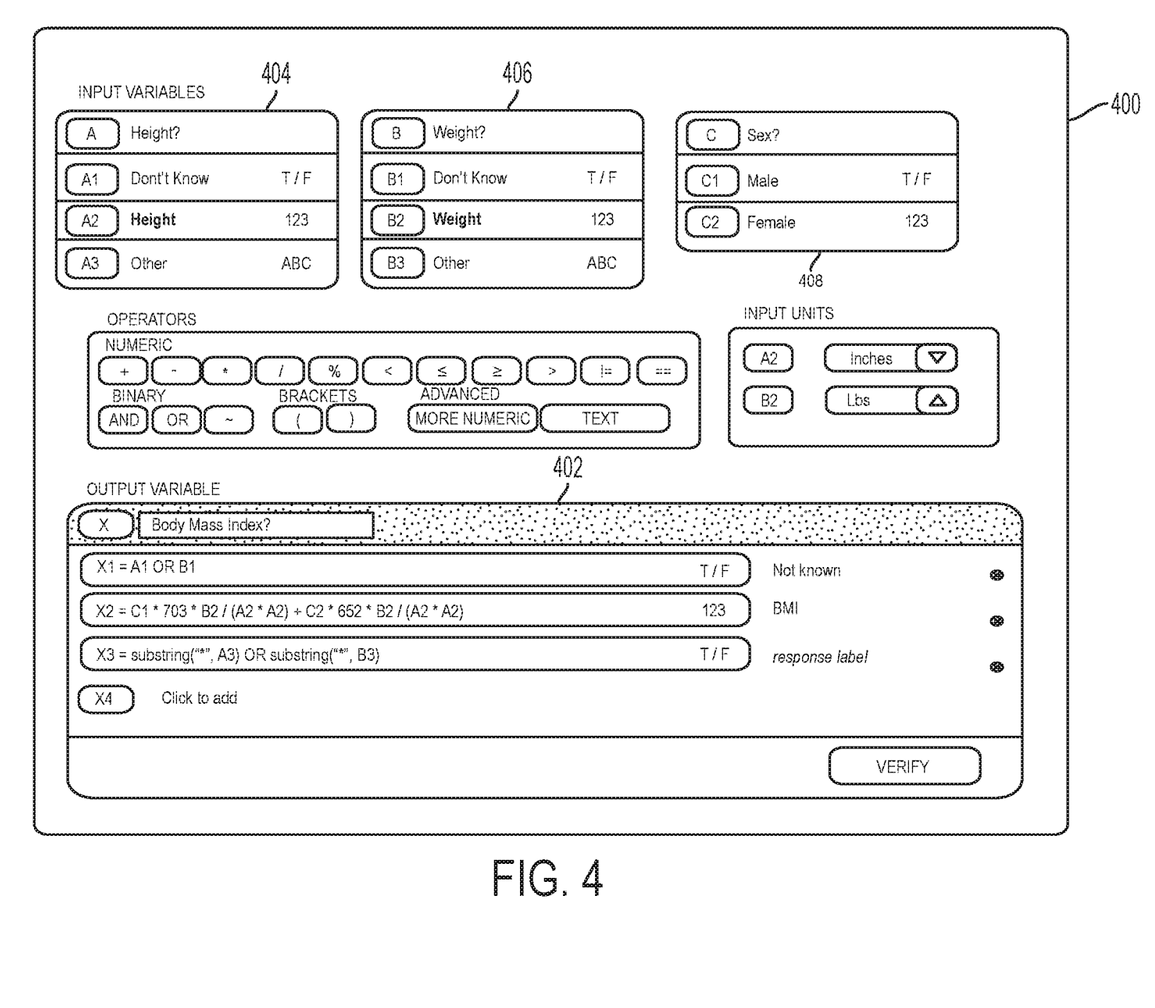
FIG. 4 shows an example interface for generating questions according to some embodiments.

FIG. 4 depicts an interface 400 for creating questions with another kind of Input Mode referred to herein as the 'derived' Input Mode. That is, FIG. 4 shows a dialog box for creating a custom-defined derived question (in this instance, on body-mass index 402) from pre-existing input variables (in this instance, height 404, weight 406, and sex 408). In general, this is a dialog that allows for the creation of a new question in the SSP that functionally relates response values submitted to already-existing questions to new response values that will thereby get automatically submitted on behalf of the user to the new question. The example in the dialog in FIG. 4 illustrates how the SSP can enable response values to three questions (measuring height, weight and sex) to be functionally related to the computation of response values for a new question (measuring Body-Mass Index; BMI).

In addition to the possible provision of an interface for creating new questions, the SSP can also provide a 'Question-creation API' (QAPI) for creating new questions. A user/director logged into his account via the SSP interface can request a unique API key for usage of the QAPI. Usage of the QAPI can require this unique API key linked to such an account. The QAPI can be made so as to receive inputs that correspond to the 'question' data structure described above (i.e., a 'question label', one or more 'response labels' and corresponding 'response types', etc.). When an attempt is made to use the QAPI to create a new question, the QAPI can return information such as an indication as to whether or not the attempt to create a new question was successful, the questionID and responseIDs automatically generated by the SSP, etc. Alternatively, the user/director can determine such information using the SSP interface when logged into his account. The QAPI can be useful for scripting in cases where a large amount of structured data is available for input to questions operating under 'Input-API' mode (described below). The capacity to create questions operating under 'Input-API' mode can be restricted to only organization accounts (and this shall be assumed in the specification from hereon without loss of generality).

The SSP can provide an 'Input API' (IAPI) that works in conjunction with questions made to operate in 'Input-API' mode. If a director sets the Input Mode of a question (to which the director has relevant permissions) to 'Input-API' then the director will be able to use the IAPI to impute response values on behalf of a user of the SSP to such a question. (This requires the director to have access to data on that same individual, i.e., for the organization the director represents to also be a SP operating a network-accessible store of user data.)

The IAPI can be made accessible to the director via a SDK provided by the SSP. For example, the SSP interface can provide code to be inserted into an organization's webpages (or a mobile app) that the director customizes in accordance with the director's intended usage of the IAPI so that, when a user visits such a webpage (or uses such a mobile app), the inserted code can trigger a dialog. The code inserted can cause the style of the dialog (e.g., designs and logos) to be associated with the SSP, and the textual contents can be determined, at least in part, by the customized inputs of the code that are carried over as inputs to the IAPI.

For example, an individual can play a game on Acme's website and achieve a score that can be stored (at least temporarily) on the client and/or within a session variable on Acme's server. Another possibility is for an individual to be logged-into an account accessible through Acme's website, and for historic scores to be loaded from a database operated by Acme into a session variable on Acme's server and/or onto the client's memory. If Acme has an organization account on the SSP then the director can arrange for a question to have been created operating under 'Input-API' mode with the intention of imputing such a score achieved on such a game as a response value to that question. Specifically, the code provided in the SDK can possess spaces with indications for inputting information related to a question data structure, a response data structure, a response-value data structure and usage parameters for the IAPI. For example, a minimal use of the IAPI can require the specification of (i) one questionID, (ii) one responseID to one of the responses of the question referenced by that questionID, and (iii) an API key for the director's account. The code provided in the SDK can be made to store inputted response values temporarily on the client (i.e., such response values wont be sent to the SSP by default, but only at a later time if/when permission for such imputation has been granted).

An initial usage of the IAPI can send input information to an SSP server that can first check if the IAPI has been used correctly. If the IAPI has been used incorrectly then the SSP server can return an error message to the application causing the dialog to fail to open and a message indicating the nature of the error can be generated (and sent to the director by email or made viewable in the SSP interface when the director is logged into the organization's account). For example, if the questionID to a question that the director/organization does not control is offered as an input to the IAPI, the server can test for this and can return a message that causes the dialog to fail to open (or to open with a failure message). If the IAPI is used correctly then the dialog can be made to open.

When a user visiting an organization's webpage (or using an organization's mobile app) triggers the opening of such a dialog, and the SSP servers have tested for a successful use of the IAPI, an 'Input Transaction' (with unique transactionID) can be generated on the server of the SSP, and an indication can be sent to the client to proceed. The IAPI can also return information to the client such as the registered name of the organization corresponding to the account associated with the API key, the question labels corresponding to the questionIDs and the response labels corresponding to the responseIDs. Note that these actions may occur prior to the user logging into the SSP. The dialog can then be used to establish that the user is logged into an account on the SSP (i.e., if the user is logged into an account, the dialog can indicate this fact and optionally ask the user to confirm that the account logged-into is in fact that of the user; if the user is not logged into an account then the dialog can provide a portal to sign into an account or register a new one). Once it is confirmed that the individual is signed-into an account on the SSP, the SSP can record that user's unique userID within the Input-Transaction data structure on the SSP's server.

The dialog can then generate a message, based upon the inputs that the director arranged to be input to the IAPI and the information returned by the IAPI, indicating to the user such information as the following:

(1) The name of the organization (whose account corresponds to the API key used in the IAPI) that is requesting to impute data that it possesses about the user into the SSP in the form of one or more response values to one or more questions (that the organization controls).

(2) A description of the nature of the proposed transaction. An example of such a description is: "[Organization's name] requests that data from your account be used to securely impute responses to the following questions on [SSP's brand name]. Your responses will remain anonymous. By partaking in such collaborative studies, you will be given free access to the statistical information generated using your data and you will also be able to earn [name of credit/currency] on [SSP's brand name] if others pay to access that statistical information."

(3) An indication of the 'share of ownership' that the user will receive in questions to which the user will agree to have his response values imputed. Such ownership can be indicated as a single measure to apply to all questions displayed in the dialog or on a question-by-question basis. An example of such an indication is: "50% of revenue generated by any question you contribute to shall be equally divided among yourself and other data contributors." The share of ownership offered to the user can be determined either by the terms of service of the SSP, or the choice of the director, or some combination of both (e.g., the SSP can impose a minimum measure of ownership for each user that the organization has to abide with).

(4) A list of the questions (marked by their question labels) and responses (marked by their response labels) to which the user's permission is being requested to have response values imputed and at least one check box that, if selected by the user, indicates that permission is being granted for imputation. Optionally, the dialog can also display the response values (e.g., 'True' in the case of a Boolean response) to be supplied by the SP on behalf of the user and imputed to the SSP if the user grants permission. Optionally, the user can also grant permission for response values to be kept updated without the SP having to re-ask for permission to do so.

(5) Optionally, a preview of the statistical results (e.g., the percentages) already calculated using the response values gathered to date in a similar fashion by other users to the displayed questions.

Once the user has selected those questions to which the user is willing to have response values imputed, the user can press a submit button in the dialog that triggers the next phase of usage of the IAPI. This phase causes the SSP to receive and record all response values (to which the user granted permission) in its database in association with the user's unique userID, the responseIDs and questionIDs (as well as other information relevant to the transaction, such as time of submission, user's share of ownership in such questions, etc.).

Figure 5:
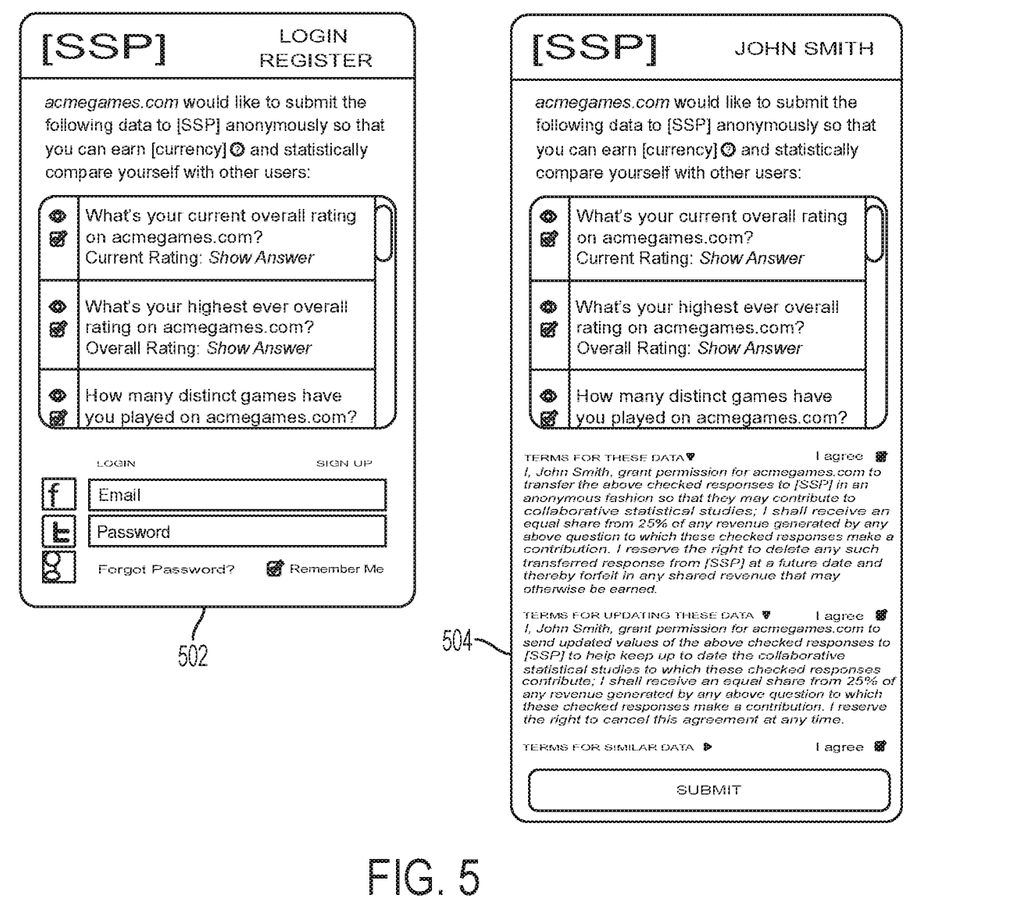
FIG. 5 shows an example dialog display according to some embodiments.

FIG. 5 depicts such an SDK-triggered dialog. In particular, FIG. 5 shows at the left image 502 what the SDK-triggered dialog might look like when the user visits the site (or uses the app of) the SP but has not yet signed into the SSP. The right image 504 depicts the dialog as it might look once the user is signed into the SSP.

The SSP can enable the user to view response values imputed on behalf of the user via the IAPI through the SSP interface when logged into his account. Optionally, the director can also be enabled to view response values imputed on behalf of a user associated with such a transactionID, which can be useful for checking that the IAPI has been used correctly. (Depending on the terms of service between the organization and the user, the director can also access the same response values on the data stores operated by the organization, so the user's anonymity is no worse off.) Optionally, the director can be given access to an SSP-provided userID that would allow (in cases where the user has granted permission) for the organization to re-use the IAPI in order to keep response values imputed to the user updated.

Optionally, the SSP can also enable the user to grant permission to the SP to impute new response values according to agreed conditions and terms of ownership for any such future imputation. The SSP can enable the SP to choose to include a unique userID for any such usage of the IAPI, and this unique userID can be used by the SSP to cross-match previously imputed response values and permissions. For example, if a user gives permission (recorded in the SSP in association with a transactionID) to the SP to keep updated a response value for that user whenever a new score on a game is achieved by that user, then the SP can use the IAPI to (i) ask the SSP to return any responseID for which a user with SP-supplied userID has given permission to the SP to keep the corresponding response value updated, (ii) receive a list of responses back from the SSP, and (iii) upon determining that permission is granted for a particular response to have a response value updated, the SP can request for a new response value be imputed on behalf of the user. An example where this could be useful would be the case where the organization is a retail company and the user is a customer who gives permission for the company to impute response values to the SSP on behalf of the user. This might be accomplished by, for example, printing out on a receipt QR code that has been associated with the user's customer-loyalty card. When the user scans the QR code associated with that particular purchase and loyalty card, the user can be presented with, e.g., a webpage (built by the retail company in this example) where (i) the customer's purchase data has been prepped for imputation, and (ii) the SDK-IAPI dialog has been triggered. Once the user has been confirmed as signed-into his SSP account, the user can be prompted with the request to have, for example, purchase data stated on the receipt imputed to the SSP, and/or for permission to have similar such purchase data made in the future using that loyalty card be automatically imputed to the SSP. (I.e., the SP would use the IAPI to receive a unique userID that it associates with that loyalty card so that, at a future time, the SP will be able to use the IAPI to automatically impute response values on behalf of that user to the SSP. The user can be enabled to see any such response values imputed when the user is logged-into his account on the SSP interface and can be enabled to cancel such permissions through controls built for that purpose.)

This concludes the description of the input side of this technique. The output side of this technique shall now be described whereby such response-value inputs are combined into the 'value-added statistical products' mentioned earlier and used to generate revenue that is distributed in turn to the organization and individual users involved in the IAPI process. The capacity of this method to enable targeting value to be extracted from data shall also be described.

The SSP can provide an interface to make viewable statistical results that the SSP can automatically generate from recorded response values related to (and cross-matched by) the unique SSP-provided userIDs in its database. Let us introduce a further data structure labeled herein as an 'investigation' and let a director or user using such an interface be referred to as the 'investigator'. An investigation is a lightweight structure that can consist of (i) one question functioning as a dependent variable, (ii) arbitrarily many responses to questions functioning as independent variables, and (iii) a set-theoretic structure between independent variables. (One can think of an investigation as the time-independent recipe for corresponding time-stamped statistical products. Investigations can encode further information for the specification of corresponding statistical products, such as application of statistical weights to correct for demographic imbalances.) The SSP's interface can enable an investigator to custom create investigations. For example, if an investigator selects one question as the dependent variable, and one response to another question as an independent variable, then only the response values of users who are recorded as having given a response value to the selected response to the independent-variable question will contribute to the statistical results displayed in correspondence with the responses to the dependent-variable question—results that can be displayed (subject to conditions described below) in the SSP interface.

The statistical results that can be displayed in the SSP interface when an investigation has been loaded by an investigator can constitute the value-added 'statistical product' referred to earlier. The statistical product can thereby consist of a set of numbers that statistically summarizes the state of the investigation (sample size, percentage of users who gave a response value, correlation coefficients, etc.). In some embodiments, part of the statistical product can be disclosed for free (e.g. sample size), while other parts require payment to access (e.g. percentages).

Figure 6:
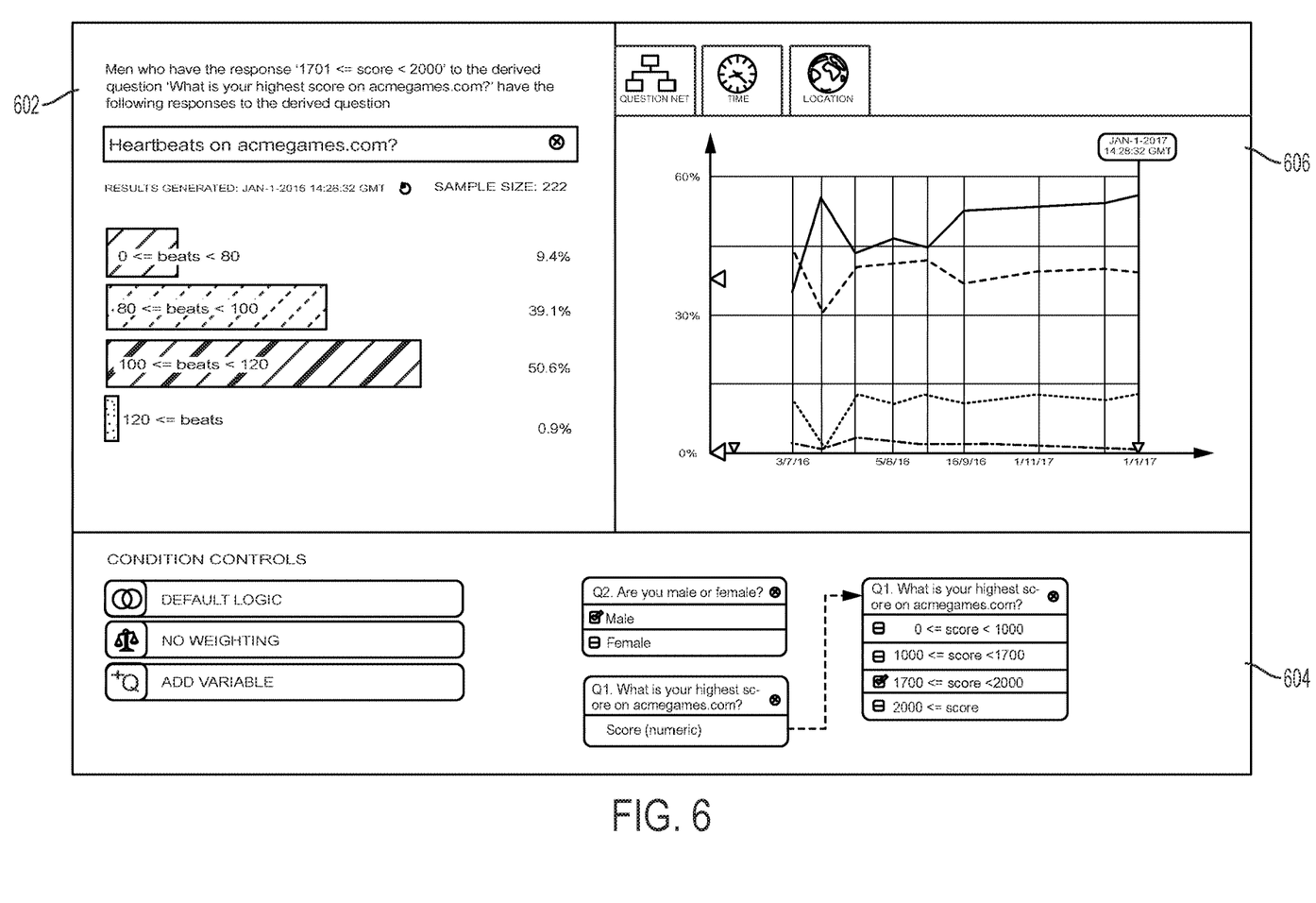
FIGS. 6 and 7 depict investigation interfaces according to some embodiments.
Figure 7:
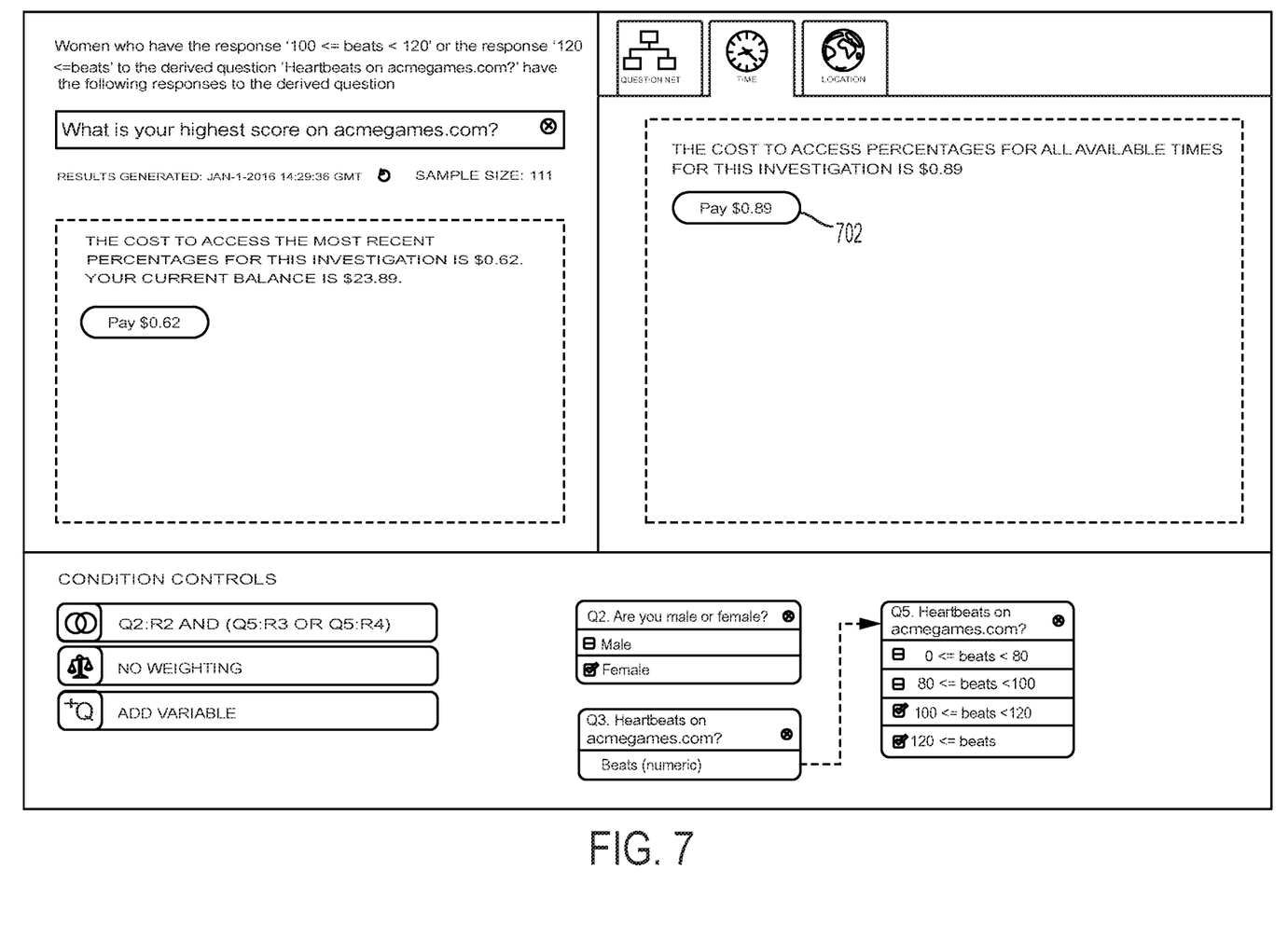

FIGS. 6 and 7 depict investigation interfaces according to some embodiments. Such an interface may be made available on a website of an SSP. The interface depicted in FIG. 6 utilizes the following five example questions.

```
//Q1 - not displayed in Fig. 7 but used to derive Q4
{
  "questionID":"questionID1",
  ...
  "questionLabel":"What is your highest score on acmegames.com?",
  "inputMode":"input-api",
  "responseOptions":[
    {
      "responseOptionID":"responseID11",
      "responseLabel":"Score",
      "responseType":"numeric",
      ...,
    }
  ]
}
//Q2
{
  "questionID":"questionID2",
  ...
  "questionLabel":"Are you male or female?",
  "inputMode":"open-poll",
  "responseOptions":[
    {
      "responseOptionID":"responseID21",
      "responseLabel":"Male",
      "responseType":"boolean",
      ...,
    },
```

```
    {
      "responseOptionID":"responseID22",
      "responseLabel":"Female",
      "responseType":"boolean",
      ...,
    }
  ]
}
//Q3 - not displayed in Fig. 6 but used to derive Q5
{
  "questionID":"questionID3",
  ...
  "questionLabel":"Heartbeats on acmewearable.com?",
  "inputMode":"input-api",
  "responseOptions":[
    {
      "responseOptionID":"responseID31",
      "responseLabel":"Beats",
      "responseType":"numeric",
      ...,
    }
  ]
}
//Q4
{
  "questionID":"questionID4",
  ...
  "questionLabel":"What is your highest score on acmegames.com?",
  "inputMode":"derived",
  "responseOptions":[
    {
      "responseOptionID":"responseID41",
      "responseLabel":"0 <= score < 1000",
      "function":"0<=responseID11&&responseID11<1000",
      "responseType":"boolean",
      ...,
    },
    {
      "responseOptionID":"responseID42",
      "responseLabel":"1000 <= score < 1700",
      "function":"1000<=responseID11&&responseID11<1700",
      "responseType":"boolean",
      ...,
    },
    {
      "responseOptionID":"responseID43",
      "responseLabel":"1700 <= score < 2000",
      "function":"1700<=responseID11&&responseID11<2000",
      "responseType":"boolean",
      ...,
    },
    {
      "responseOptionID":"responseID44",
      "responseLabel":"2000 <= score",
      "function":"2000<=responseID11",
      "responseType":"boolean",
      ...,
    }
  ]
}
//Q5
{
  "questionID":"questionID5",
  ...
  "questionLabel":"Heartbeats on acmewearable.com?",
  "inputMode":"derived",
  "responseOptions":[
    {
      "responseOptionID":"responseID51",
      "responseLabel":"0 < beats < 80",
      "function":"0<=responseID31&&responseID31<80",
      "responseType":"boolean",
      ...,
    },
    {
      "responseOptionID":"responseID52",
      "responseLabel":"80 <= beats < 100",
      "function":"80<=responseID31&&responseID31<100",
      "responseType":"boolean",
      ...,
    },
    {
      "responseOptionID":"responseID53",
      "responseLabel":"100 <= beats < 120",
      "function":"100<=responseID31&&responseID31<120",
      "responseType":"boolean",
      ...,
    },
    {
      "responseOptionID":"responseID53",
      "responseLabel":"120 <= beats",
      "function":"120<=responseID31",
      "responseType":"boolean",
      ...,
    }
  ]
}
```

Note that the interface depicted in FIG. 6 is split into three panels, 602, 604, 606. The top-left panel 602 is the 'Dependent-Variable Panel' where one loads (via a word-search field that acts primarily on the question label attribute) a question from the database to act in the capacity of a dependent variable. The bottom panel 604 is the 'Independent-Variable Panel' (IVP) where one chooses (i) arbitrarily many response options to questions (using e.g., checkboxes) from the database, and (ii) a set-theoretic relation between response options.

In the displayed example, this particular investigation, I1, has the following structure:
  I1={"dependentVariable": "Q5", "independentVariables": "Q2:R1&&Q4:R3"}

The notation Q2:R1 means the first response option to the 2nd question.

Additionally (though optionally), one can use arrows and/or color coding to represent relations between response options and questions in the IVP; here we display the fact that Q4 is functionally derived from Q1 (i.e., by mapping a continuous variable to discrete bins) using a dotted arrow.

The information in investigation 11 is used to generate the descriptive text displayed before the contents of the question label of the dependent question: "Men who have the response '1700<=score<2000' to the derived question 'What is your highest score on acmegames.com?' have the following responses to the derived question".

The top-right panel 606 is the Graphics Panel; this just creates different views on the returned statistical information associated with the loaded investigation. In the given example, the 'Time Tab' is selected enabling the state of the data corresponding to this investigation at different times to be viewed simultaneously (as an X-Y plot).

The interface depicted in FIG. 7 depicts features similar to those of FIG. 6. In this example, the investigation has been altered so that it now has the following structure, I2:
  I2={"dependentVariable": "Q4", "independentVariables":"Q2:R2&&(Q5:R3||Q5:R4)"}

In other words, the question that had previously been acting in the capacity of the dependent variable (Q5) is now acting in the capacity of an independent variable, and vice-versa (Q4 is now the dependent variable). From the two examples of FIGS. 6 and 7, one can discern that the number of possible investigations grows very rapidly with the number of questions in the database.

Unlike the interface of FIG. 6, the interface of FIG. 7 indicates that the investigator has not yet bought access to the statistical results of the investigation. Instead, in this example, the investigator is shown how much it would cost in dollars 702 to gain access to views like those shown in FIG. 6. (The revenue received from such currency transactions is then distributed to the users and directors who brought about the statistical product in the first place).

The SSP can charge currency to an investigator to access the statistical product associated with an investigation. Such currency can be a virtual currency specific to the SSP, or a currency of external governance/origin (dollars, bitcoins, etc.). The cost to an investigator of buying access to a statistical product associated with an investigation can be made to depend on various factors such as:

Sample Size: investigations with larger sample sizes are generally more valuable and can therefore elicit higher payment.

Control of Questions: the director/user who controls a question featuring in an investigation can, in some embodiments, completely determine the added cost of buying access to an associated statistical product due to the inclusion of that question featuring in the investigation; in other embodiments, the user/director can only determine the added cost up to limits determined by SSP policy.

Purchase History: if an investigator has already brought access to a statistical product associated with a similar investigation (i.e., one involving a similar combination of responses and/or questions) then it can be made to cost less to access the statistical product of an investigation. For example, if an investigator has already bought access to an investigation consisting of a single dependent question conditioned upon the response 'Male' to the question 'Are you male or female?', then it can be made to cost comparatively less (all else being equal) to then buy access to an investigation consisting of the same single dependent variable conditioned upon the response 'Female' to the same question on sex.

The SSP can provide measures for statistical-disclosure control to help ensure that the individuals whose data is used to generate the statistical products remain anonymous. For example, a minimal sample size on investigations can be imposed before access to a statistical product can be bought. Likewise, response percentages to a dependent question in an investigation can be made irresolvable until some minimal sample size for each response to that question has been achieved. This can be important when an investigation involves questions that are classed as being on a sensitive subject.

Currency transferred to the SSP from the investigator for access to a statistical product can then be distributed by the SSP to users and directors in the following way. First, the SSP can take a share in accordance with terms and conditions conveyed in advance to the users and directors of the SSP. Second, the remaining currency can be divided amongst the owners of the questions featuring in the investigation. Third, for each question that receives revenue, that revenue can be divided amongst the users and/or director in proportion to their ownership claims on that question. For example, suppose a question is created to operate under the 'Input-API' Input Mode, 100 participating users are given 50% ownership (the other 50% belonging to the organization that controls the question), and the question manages to generate 220 units of currency through its featuring in investigations that elicit the purchase of associated statistical products. If the SSP takes a ~10% share then the remaining 200 units of currency will be split 50-50, i.e., the organization's account will receive 100 units of currency and each account of the 100 users whose response values were used to generate the statistical product will receive 1 unit of currency.

To summarize the output process so far, as already indicated, an investigation can comprise arbitrarily many questions that are controlled by different parties. By combining data inputs from multiple sources so as to build up more detailed profiles of individuals, the contributing SPs are not only able to collaboratively construct richer investigations than they otherwise would, but these value-added statistical products can then also be sold on a market basis to the benefit of all parties involved.

In addition to providing a market service where various SPs can impute data so as to produce value-added statistical products, the SSP can also play the role of a SP by providing a centralized data-collection platform. For example, the SSP can enable users to answer 'open-poll' questions (outlined earlier) and then such open-poll questions can be selected to feature in an investigation. By imputing response values to the SSP, the SP can thereby bypass the need to set up and pose survey questions to users via their own website or app if such questions are available to be answered on the SSP. For example, if users are asked to provide demographic information upon creating an account on the SSP, then the SP could gain access to statistical products associated with investigations that feature such demographic information by imputing data to the SSP on behalf of such users. (This way a user only has to provide answers to survey questions once on the SSP for x SPs to be able to effectively survey their customers, without their customers having to answer the same survey question x times on x separate SP-operated sites.) An example was given in FIGS. 6 and 7 where the sex of users, as determined by an open-poll question Q2 on the SSP, was 'mixed' with data that originated external to the SSP (viz. by the SP) in investigations 11 and 12.

Alternatively, the SP can first impute users' data to the SSP and then use the functionality provided by the SSP to direct such users to respond to further open-poll questions created on the SSP. Investigations can then be created on the SSP interface involving combinations of open-poll questions, API-input-mode questions, and their derivatives. Users can be motivated to participate in the imputation of their data to the SSP and to answer such open-poll questions in order to receive currency and/or to gain access to statistical products thereby produced on the SSP.

Specifically, in some embodiments, users of the SSP can obtain 'shares of ownership' in open-poll questions on the SSP by answering them. When such questions are used to build investigations, currency spent to access corresponding statistical products is then distributed to share holders in questions featuring in the investigation (as either dependent or independent variables). In the example shown in FIG. 7, currency could be first shared amongst questions Q2, Q4 and Q5, and then, for Q2, currency could be shared amongst all share holders of Q2 in proportion to shares held. Thus, the manner in which shares are issued to users will generally depend on the type of question and which parties were responsible for populating that question with response values.

In general, any data that ends up in the SSP as a response value submitted by (or on behalf of) a user to a question can benefit the user through the issuing of shares of ownership in the question to the user. Another example that conveys the flexibility (and therefore power) of this method consists in yet another type of derived question—one associated with social-media logins. If a user logs into the SSP using e.g. his Facebook™ account, then a response value 'true' can be submitted automatically to a response option labeled 'Yes' to a question of a distinct type (attribute e.g. "type":"facebook-derived") with question label 'logged-in via Facebook?', and one share of ownership in the question can be issued to the user. If others then build investigations using such a 'facebook-derived' question and spend currency to access associated statistical products, then some such currency gets distributed to the users who chose to log in via their Facebook™ accounts.

In some embodiments the creator of the question can determine, in whole or in part, the cost of using that question to create a statistical product. One way of implementing such variable costs is to associate with each question a 'base-access cost' (BAC), which is a one-time cost that an investigator has to pay to use that question, and then the BAC is no longer added to the cost when that particular investigator builds further investigations involving that question. If the creator of a question thinks that there is a very small market for a question but thinks that members of that market would be willing to pay a high price to access such specialized statistical products, then it will be in the creator's interest to set the BAC relatively high in order to maximize revenue.

The SSP also enables 'targeting value' to be extracted from data in network accessible stores. For example, an advertiser could build an investigation with a 'loaded question' of type 'open-poll' involving an advertising message as the dependent variable, and select responses to questions of type 'input-api' functioning as independent variables. In some embodiments, the SSP enables investigators to spend currency to 'promote' the probability that a desired question be presented to users of the SSP characterized by the responses selected by the investigator as independent variables. In the case of an advertiser, that promoted question can be a loaded open-poll question, or an anti-robot-test question (i.e. a pattern-recognition test involving an advertising message).

Whatever statistical products elicit demand in the market furnished by the SSP will end up benefitting the shareholders of questions that featured in the corresponding investigation. The prospect of revenue incentivizes users to see to it that data is supplied to questions that are demanded. For this reason, it can be advantageous in certain embodiments of the SSP to provide data as to the performance of each question in the marketplace. For example, the SSP interface can enable one to view how much revenue has been generated by a question, how many shares have been issued and, thus, allow one to gauge the value of the question (seen as an asset). Such measures allow various indices to be formed and associated with questions and users of the SSP. For example, one could compute an index for the users who create the best (viz. most profitable) questions, and generate leader boards on the SSP to promote a sense of gamification in the information market. Likewise, questions could be ranked in competitive newsfeeds as a function of their profitability and time since creation.

Figure 8:
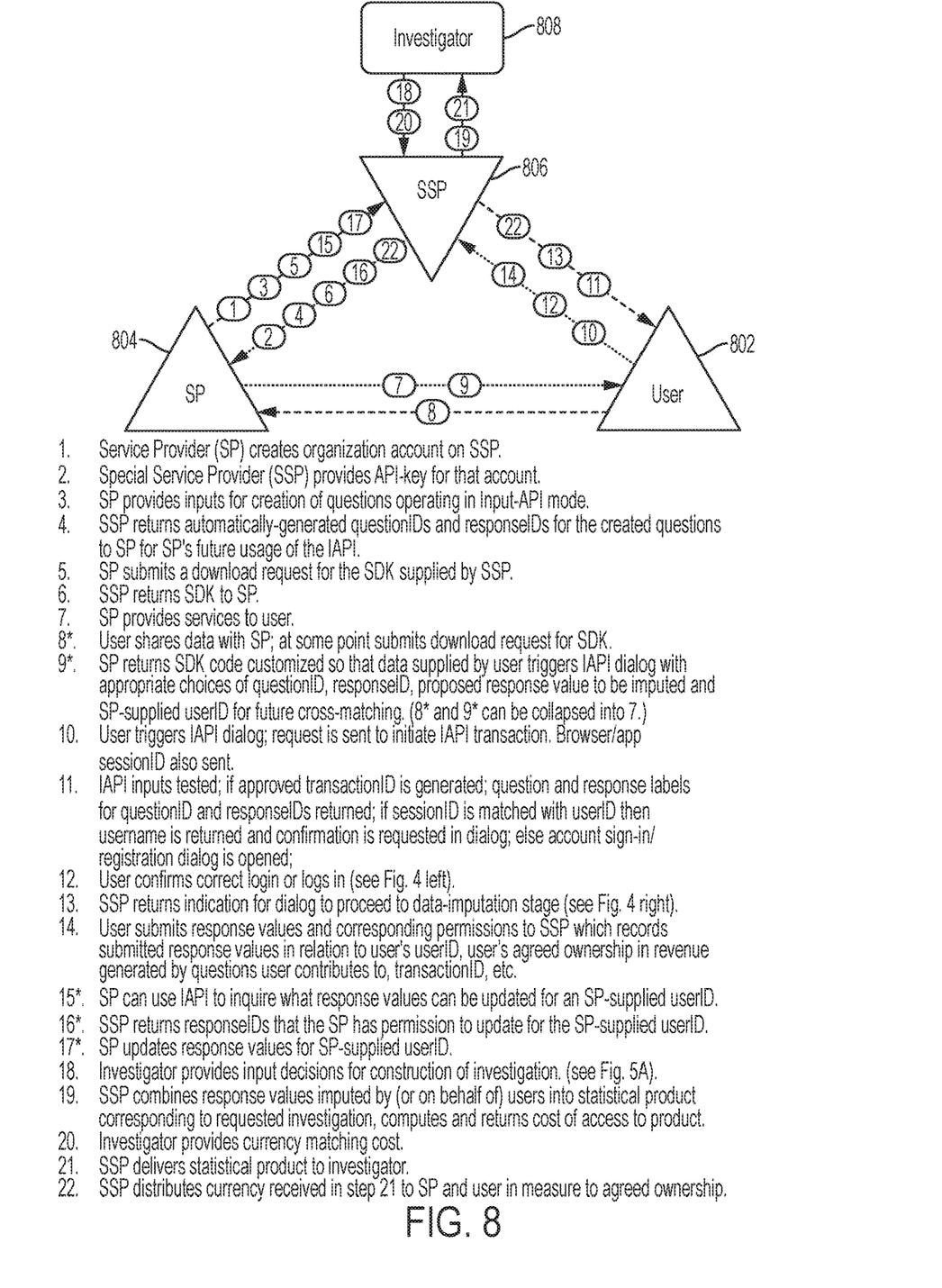
FIG. 8 depicts example interactions among parties according to various embodiments.

FIG. 8 depicts example interactions among parties according to various embodiments. The interactions of FIG. 8 provide for a process according to various embodiments. As shown in FIG. 8, the interactions are among a user 802, a service provider 804, a special service provider 806, and an investigator 808.

The disclosed embodiment may have many applications. An example of a highly useful application of the disclosed process includes the providing of SPs with a means for converting data that is stored in a non-human-readable manner to be 'recast' in an explicitly human-readable manner. For example, if acmegames.com has a column of user scores in its database then only the operators of the SP database who have knowledge of how this data structure came about and how it relates to other data structures would be able to use it to generate 'statistical insights'. However, by imputing such elementary pieces of data into the SSP repository in association with a descriptive question label (e.g., "What is the highest score of users of acemgames.com?") and resultant responses labels (e.g., "Highest Score:") and response types (e.g., numeric), any investigator can then understand what the nature of the data is and can construct with ease a very large variety of investigations (and thereby gain a wide range of statistical insights) by simply selecting such questions and/or responses as the dependent and/or independent variables. This fact about the method can be useful, for example, in converting data that does not originate in the form of a human-given response to a survey question into something that is structurally identical to a human-given 'virtual' response to a 'functionally-derived' survey question. For example, if a person uses a graphical-user interface to create an avatar that represents his appearance by, for example, clicking on icons that represent 'blond hair', 'brown eyes', etc., then such data is typically stored in a non-human-readable manner. But the SSP would enable such data to be 'recast', so-to-speak, in terms of virtual responses to derived questions that are human-readable and can thereby be easily crafted into investigations that yield statistical products that are then relatively easy to interpret.

Another example application of the disclosed technique is for use with a biometric device that measures, for example, the blood-iron level of a person that is stored on a database operated by the company that governs the construction and use of the device. Such a set of numeric readings can then be imputed into the SSP according to procedures described above as 'virtual responses' to 'derived questions'. In some cases, a virtual response to a derived question may not, by itself, be understood by an investigator (e.g., if the description of the question is technical in nature or highly specific to the mechanics of the device). However, the SSP can enable a director who has relevant knowledge of the origin of the data to functionally combine variables stored in the SSP to produce new variables, and these new variables can be understood by investigators. For example, if a director imputes data for a technical reading on blood-iron level into the SSP (e.g., with question label "What is your class-III hemoglobin count?"), then that director can use it along with other data available in the form of responses to questions on the SSP (e.g., sex, height, weight, pregnancy status) to produce new derived questions (e.g., "What is your blood-iron level?") with sensibly defined and labeled responses (e.g., "dangerously low", "low", "normal", "high", "dangerously high") that can then be understood by less-technically informed investigators in the construction of investigations. The SSP can enable such custom construction of derived questions via a graphical interface as depicted in FIG. 4.

Certain embodiments can be performed as a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of obtaining and providing statistical information about a plurality of user internet interactions while preserving user anonymity, the method comprising:
   providing, over an electronic computer network and by at least one electronic processor, a respective application program interface (API) key to each of a plurality of service providers, whereby at least one service provider of the plurality of service providers obtains, using a respective API key, a question data structure comprising a question label field comprising a question label value, a question identification (ID) field lacking a question ID value, and a response option field comprising at least one response value;
   providing, over an electronic computer network and by at least one electronic processor, a question ID value to the at least one service provider, wherein the question ID value is associated with the question ID field of the question data structure obtained by the at least one service provider;
   storing an electronic association of the question ID value with the question data structure in an electronic database;
   providing, over an electronic computer network and by at least one electronic processor, a software development kit (SDK) to each of the plurality of service providers, whereby each service provider of the plurality of service providers uses the SDK to provide respective users of respective service provider services with a login interface in conjunction with a respective service provided by a respective service provider, whereby the at least one service provider displays a question represented by the question label value to users in conjunction with a service provided by the at least one service provider and acquires corresponding user response values from responding users;
   obtaining the corresponding user response values from the at least one service provider;
   combining a plurality of the user response values to generate a statistical product, wherein the combining comprises applying at least one statistical-disclosure control measure to ensure that the responding users remain anonymous;
   selling the statistical product; and
   providing compensation to the responding users.

2. The method of claim 1, wherein the obtaining the corresponding user response values comprises obtaining a plurality of response value data structures each comprising a user identification, a response identification, and a response value.

3. The method of claim 1, further comprising:
   providing a website interface by which an investigator may generate an investigation data structure representing the statistical product; and
   obtaining, through the website interface and from the investigator, the investigation data structure.

4. The method of claim 3, wherein the investigation data structure comprises an independent variable question and at least one dependent variable question.

5. The method of claim 1, further comprising:
   providing a website question generation interface by which a service provider of the plurality of service providers can generate a question data structure; and
   obtaining the question data structure generated by the at least one service provider of the plurality of service providers through the website question generation interface.

6. The method of claim 1, wherein the SDK comprises code for inclusion in a service provider website, wherein the code, upon execution, causes a display of the login interface.

7. The method of claim 6, wherein the login interface comprises a display of the question label value in a login interface of the at least one service provider.

8. The method of claim 1, further comprising receiving a plurality of requests from respective service providers to create respective accounts, wherein the providing the respective API key is in response to receiving one of the requests.

9. The method of claim 1 wherein no two service providers of the plurality of service providers communicate user response values to each other.

10. The method of claim 1, wherein the statistical product does not identify any user.

11. A system for obtaining and providing statistical information about a plurality of user internet interactions while preserving user anonymity, the system comprising:
    one or more electronic processors; and
    an electronic memory system comprising one or more non-transitory, computer-readable media storing instructions which, when executed by at least one of the one or more electronic processors, cause the computing system to perform operations, the operations comprising:
       providing, over an electronic computer network and by at least one electronic processor, a respective application program interface (API) key to each of a plurality of service providers, whereby at least one service provider of the plurality of service providers obtains, using a respective API key, a question data structure comprising a question label field comprising a question label value, a question identification (ID) field lacking a question ID value, and a response option field comprising at least one response value;
       providing, over an electronic computer network and by at least one electronic processor, a question ID value to the at least one service provider, wherein the question ID value is associated with the question ID field of the question data structure obtained by the at least one service provider;
       storing an electronic association of the question ID value with the question data structure in an electronic database;
       providing, over an electronic computer network and by at least one electronic processor, a software development kit (SDK) to each of the plurality of service providers, whereby each service provider of the plurality of service providers uses the SDK to provide respective users of respective service provider services with a login interface in conjunction with a respective service provided by a respective service provider, whereby the at least one service provider displays a question represented by the question label value to users in conjunction with a service provided by the at least one service provider and acquires corresponding user response values from responding users;

obtaining the corresponding user response values from the at least one service provider;

combining a plurality of the user response values to generate a statistical product, wherein the combining comprises applying at least one statistical-disclosure control measure to ensure that the responding users remain anonymous;

selling the statistical product; and providing compensation to the responding users.

12. The system of claim 11, wherein the obtaining the corresponding user response values comprises obtaining a plurality of response value data structures each comprising a user identification, a response identification, and a response value.

13. The system of claim 11, further comprising a website interface by which an investigator may generate an investigation data structure representing the statistical product; wherein the operations further comprise obtaining, through the website interface and from the investigator, the investigation data structure.

14. The system of claim 13, wherein the investigation data structure comprises an independent variable question and at least one dependent variable question.

15. The system of claim 11, further comprising a website question generation interface by which a service provider of the plurality of service providers can generate a question data structure; wherein the operations further comprise obtaining the question data structure generated by the at least one service provider of the plurality of service providers through the website question generation interface.

16. The system of claim 11, wherein the SDK comprises code for inclusion in a service provider website, wherein the code, upon execution, causes a display of the login interface.

17. The system of claim 16, wherein the login interface comprises a display of the question label value in a login interface of the at least one service provider.

18. The system of claim 11, wherein the operations further comprise receiving a plurality of requests from respective service providers to create respective accounts, wherein the providing the respective API key is in response to receiving one of the requests.

19. The system of claim 11 wherein no two service providers of the plurality of service providers communicate user response values to each other.

20. The system of claim 11, wherein the statistical product does not identify any user.

21. Non-transitory computer readable media comprising instructions which, when executed by at least one electronic processor, cause the at least one electronic processor to perform a method of obtaining and providing statistical information about a plurality of user internet interactions while preserving user anonymity, by performing operations comprising:

providing, over an electronic computer network and by at least one electronic processor, a respective application program interface (API) key to each of a plurality of service providers, whereby at least one service provider of the plurality of service providers obtains, using a respective API key, a question data structure comprising a question label field comprising a question label value, a question identification (ID) field lacking a question ID value, and a response option field comprising at least one response value;

providing, over an electronic computer network and by at least one electronic processor, a question ID value to the at least one service provider, wherein the question ID value is associated with the question ID field of the question data structure obtained by the at least one service provider;

storing an electronic association of the question ID value with the question data structure in an electronic database;

providing, over an electronic computer network and by at least one electronic processor, a software development kit (SDK) to each of the plurality of service providers, whereby each service provider of the plurality of service providers uses the SDK to provide respective users of respective service provider services with a login interface in conjunction with a respective service provided by a respective service provider, whereby the at least one service provider displays a question represented by the question label value to users in conjunction with a service provided by the at least one service provider and acquires corresponding user response values from responding users;

obtaining the corresponding user response values from the at least one service provider;

combining a plurality of the user response values to generate a statistical product, wherein the combining comprises applying at least one statistical-disclosure control measure to ensure that the responding users remain anonymous;

selling the statistical product; and providing compensation to the responding users.

* * * * *